US012333943B2

(12) United States Patent
Ustach

(10) Patent No.: US 12,333,943 B2
(45) Date of Patent: Jun. 17, 2025

(54) IMPACT MONITORING SYSTEM

(71) Applicant: McCue Corporation, Danvers, MA (US)

(72) Inventor: Thomas Ustach, Boston, MA (US)

(73) Assignee: McCue Corporation, Danvers, MA (US)

( * ) Notice: Subject to any disclaimer, the term of this patent is extended or adjusted under 35 U.S.C. 154(b) by 36 days.

(21) Appl. No.: 18/529,202

(22) Filed: Dec. 5, 2023

(65) Prior Publication Data
US 2024/0185718 A1  Jun. 6, 2024

Related U.S. Application Data

(60) Provisional application No. 63/430,095, filed on Dec. 5, 2022.

(51) Int. Cl.
G08G 1/16 (2006.01)
(52) U.S. Cl.
CPC ............ G08G 1/164 (2013.01); G08G 1/166 (2013.01)
(58) Field of Classification Search
None
See application file for complete search history.

(56) References Cited

U.S. PATENT DOCUMENTS

| | | | |
|---|---|---|---|
| 10,353,395 B2 * | 7/2019 | Hance ................... | G06Q 10/08 |
| 10,600,256 B2 * | 3/2020 | Ziegler .................. | G06Q 10/06 |
| 11,093,785 B1 * | 8/2021 | Siddiquie ........... | G06Q 30/0633 |
| 11,983,667 B2 * | 5/2024 | Jacobus ................. | G05D 1/247 |
| 2011/0153469 A1 * | 6/2011 | Mackenzie ...... | G06Q 10/08355 705/28 |
| 2012/0025964 A1 * | 2/2012 | Beggs .................... | G08G 1/166 340/435 |
| 2016/0048938 A1 * | 2/2016 | Jones ..................... | H04L 67/10 705/7.28 |
| 2017/0091704 A1 * | 3/2017 | Wolf ..................... | G06Q 10/08 |
| 2017/0270462 A1 * | 9/2017 | Morgenthau ......... | G06Q 10/103 |

(Continued)

FOREIGN PATENT DOCUMENTS

| | | |
|---|---|---|
| KR | 20130045877 A | 5/2013 |
| WO | 2011041351 A2 | 4/2011 |
| WO | 2017203235 A1 | 11/2017 |

OTHER PUBLICATIONS

International Search Report and Written Opinion, PCT Application No. PCT/US2023/082462, mailed Feb. 28, 2024 (11 pages).

*Primary Examiner* — Muhammad Adnan
(74) *Attorney, Agent, or Firm* — Occhiuti & Rohlicek LLP

(57) ABSTRACT

An impact monitoring system includes multiple sensor nodes including multiple stationary sensor nodes affixed to stationary objects in an environment, the multiple stationary sensor nodes including a first stationary sensor node affixed to a first stationary object; and one or more mobile sensor nodes affixed to mobile objects in the environment, the one or more mobile sensor nodes including a second mobile sensor node affixed to a second mobile object; and a monitor configured to wirelessly receive first data characterizing an impact event experienced by the first stationary sensor node and second data characterizing the impact event experienced by the second mobile sensor node, and to identify that the second mobile object impacted the first stationary object based at least in part on the first data and the second data.

22 Claims, 4 Drawing Sheets

(56) References Cited

U.S. PATENT DOCUMENTS

| | | | | |
|---|---|---|---|---|
| 2017/0357270 | A1* | 12/2017 | Russell | G06V 20/10 |
| 2018/0059635 | A1* | 3/2018 | Johnson | G06K 7/1417 |
| 2019/0265702 | A1* | 8/2019 | Igata | G05D 1/0276 |
| 2020/0218283 | A1* | 7/2020 | Wellman | G05D 1/69 |
| 2020/0311845 | A1* | 10/2020 | Steketee | G06Q 10/087 |
| 2021/0088394 | A1* | 3/2021 | Oswald | G06Q 10/08 |
| 2022/0318723 | A1* | 10/2022 | Cosby | G06Q 10/087 |
| 2023/0377455 | A1* | 11/2023 | Karapantelakis | G08G 1/0116 |
| 2024/0355207 | A1* | 10/2024 | Reed | G08G 1/04 |

* cited by examiner

IMPACT MONITORING SYSTEM

CROSS-REFERENCES TO RELATED APPLICATIONS

This application claims the benefit of U.S. Provisional Application No. 63/430,095 filed on Dec. 5, 2022. The entire contents of U.S. Provisional Application No. 63/430,095 are incorporated herein by reference.

BACKGROUND OF THE INVENTION

This invention relates to a monitoring system for a warehouse or other storage facility.

A warehouse is a building for storing goods such as raw materials and finished goods. Warehouses often have mobile objects such as cranes and forklifts for moving goods to and from stationary objects such as pallet racks. Forklifts are dangerous pieces of equipment-especially when proper care isn't taken. One false move can cause costly and extensive damage to objects in the warehouse as well as create hazards to those working in the warehouse environment and to the warehouse itself. Factors leading to crashes and damage to property and inventory include forklift driver error, design of the workplace, work organization, and operational malfunctions.

SUMMARY OF THE INVENTION

Forklifts move freely throughout warehouse environments and occasionally impact stationary objects (e.g., pallet racks or protective barriers) and even other forklifts. Even occasional impacts can cause costly damage to objects in the warehouse and can create hazards in the warehouse environment (e.g., by making a pallet rack unstable). Aspects described herein relate to a system that monitors impacts experienced by both mobile and stationary objects in a warehouse. Impacts that are detected by the system are processed to provide alerts or other relevant information to parties such as the warehouse owners or managers.

In a general aspect of the invention, an impact monitoring system includes multiple sensor nodes including multiple stationary sensor nodes affixed to stationary objects in an environment, the multiple stationary sensor nodes including a first stationary sensor node affixed to a first stationary object; and one or more mobile sensor nodes affixed to mobile objects in the environment, the one or more mobile sensor nodes including a second mobile sensor node affixed to a second mobile object; and a monitor configured to wirelessly receive first data characterizing an impact event experienced by the first stationary sensor node and second data characterizing the impact event experienced by the second mobile sensor node, and to identify that the second mobile object impacted the first stationary object based at least in part on the first data and the second data.

Embodiments of this aspect of the invention may include one or more of the following features.

The monitor may be configured to correlate the first data and the second data as resulting from a same impact event. For example, the monitor may be configured to determine the same impact event on the basis of a time characteristic detected by at least one of the multiple stationary sensor nodes and at least one of the one or more mobile sensor nodes. Alternatively, the monitor may be configured to determine the same impact event on the basis of an acceleration characteristic detected by at least one of the multiple stationary sensor nodes and at least one of the one or more mobile sensor nodes.

The monitor may be configured to aggregate correlated data from multiple impact events. For example, the monitor may be configured to count impact events involving each mobile sensor node. Moreover, the monitor may be configured to generate a ranking of the one or more mobile sensor nodes according to each mobile sensor node's count of impact events to evaluate the relative likelihood for a corresponding mobile object and operator to cause an impact event.

The monitor may also be configured to generate a distribution plot for a count of impact events as a function of corresponding time of impact within a time cycle aggregated over multiple time cycles to identify a time pattern or trend of the plurality of impact events. Alternatively, the monitor may be configured to generate a distribution plot for a count of impact events involving a sensor node as a function of corresponding time of impact within each time cycle aggregated over multiple time cycles to identify a time pattern or trend of multiple impact events involving the sensor node.

In another example, the monitor may be configured to generate a distribution plot for a count of impact events as a function of corresponding acceleration characteristic aggregated over the multiple impact events to identify a pattern or trend of a magnitude or direction of the multiple impact events. Alternatively, the monitor may be configured to generate a distribution plot for an acceleration characteristic as a function of corresponding time of impact for multiple impact events within a time cycle aggregated over multiple time cycles to identify patterns and trends of a type of impact within the time cycle.

Two of the stationary sensor nodes and one of the one or more mobile sensor nodes may identify a trespassing event based at least in part on determining a location of the mobile sensor node by a triangulation process, and the monitor may be configured to receive and aggregate data of multiple trespassing events of the one or more mobile sensor nodes to provide a user with counts, ranks, patterns, and trends related to the multiple trespassing events.

The monitor may also be configured to generate a visual representation of real time status of the multiple stationary sensor nodes and the one or more mobile sensor nodes in the environment.

In another general aspect of the invention, a method for impact monitoring includes the following steps. Multiple stationary sensor nodes are affixed to stationary objects in an environment, the multiple stationary sensor nodes including a first stationary sensor node affixed to a first stationary object. One or more mobile sensor nodes are affixed to mobile objects in the environment, the one or more mobile sensor nodes including a second mobile sensor node affixed to a second mobile object. First data characterizing an impact event experienced by the first stationary sensor node and second data characterizing the impact event experienced by the second mobile sensor node is wirelessly received. The second mobile object is identified as having impacted the first stationary object based at least in part on the first data and the second data.

Embodiments of this aspect of the invention may include one or more of the following features.

Identifying that the second mobile object impacted the first stationary object may include correlating the first data and the second data as resulting from a same impact event on the basis of a time characteristic detected by the first stationary sensor node and the second mobile sensor node.

Alternatively, identifying that the second mobile object impacted the first stationary object may include correlating the first data and the second data as resulting from a same impact event on the basis of an acceleration characteristic detected by the first stationary sensor node and the second mobile sensor node.

The method for impact monitoring may further include counting impact events involving each mobile sensor node. Alternatively, the method may further include generating a ranking of the one or more mobile sensor nodes according to each mobile sensor node's count of impact events to evaluate the relative likelihood for a corresponding mobile object and operator to cause an impact event.

The method for impact monitoring may further include the following aggregation steps. A distribution plot may be generated for a count of impact events as a function of corresponding time of impact within a time cycle aggregated over multiple time cycles to identify a time pattern or trend of multiple impact events. Alternatively, a distribution plot may be generated for a count of impact events as a function of corresponding acceleration characteristic aggregated over multiple impact events to identify a pattern or trend of a magnitude or direction of the multiple impact events. Alternatively, a distribution plot may be generated for an acceleration characteristic as a function of corresponding time of impact for multiple impact events within a time cycle aggregated over multiple time cycles to identify patterns and trends of a type of impact within the time cycle.

The method for impact monitoring may further include the following steps. A trespassing event may be identified by two of the stationary sensor nodes and one of the one or more mobile sensor nodes based at least in part on determining a location of the mobile sensor node through a triangulation process. Data of multiple trespassing events of the one or more mobile sensor nodes may be received wirelessly and aggregated to provide a user with counts, ranks, patterns, and trends related to the multiple trespassing events.

The method for impact monitoring may further comprise generating a visual representation of real time status of multiple stationary sensor nodes and one or more mobile sensor nodes in the environment.

Among other advantages, the monitoring system provides a cost-effective mechanism for collecting and transmitting data characterizing prohibited events such as physical impacts. Aspects also enable timely analysis and reporting of prohibited events or patterns of prohibited events to warehouse management.

Other features and advantages of the invention are apparent from the following description, and from the claims.

DETAILED DESCRIPTION

1 System Overview

Figure 1:
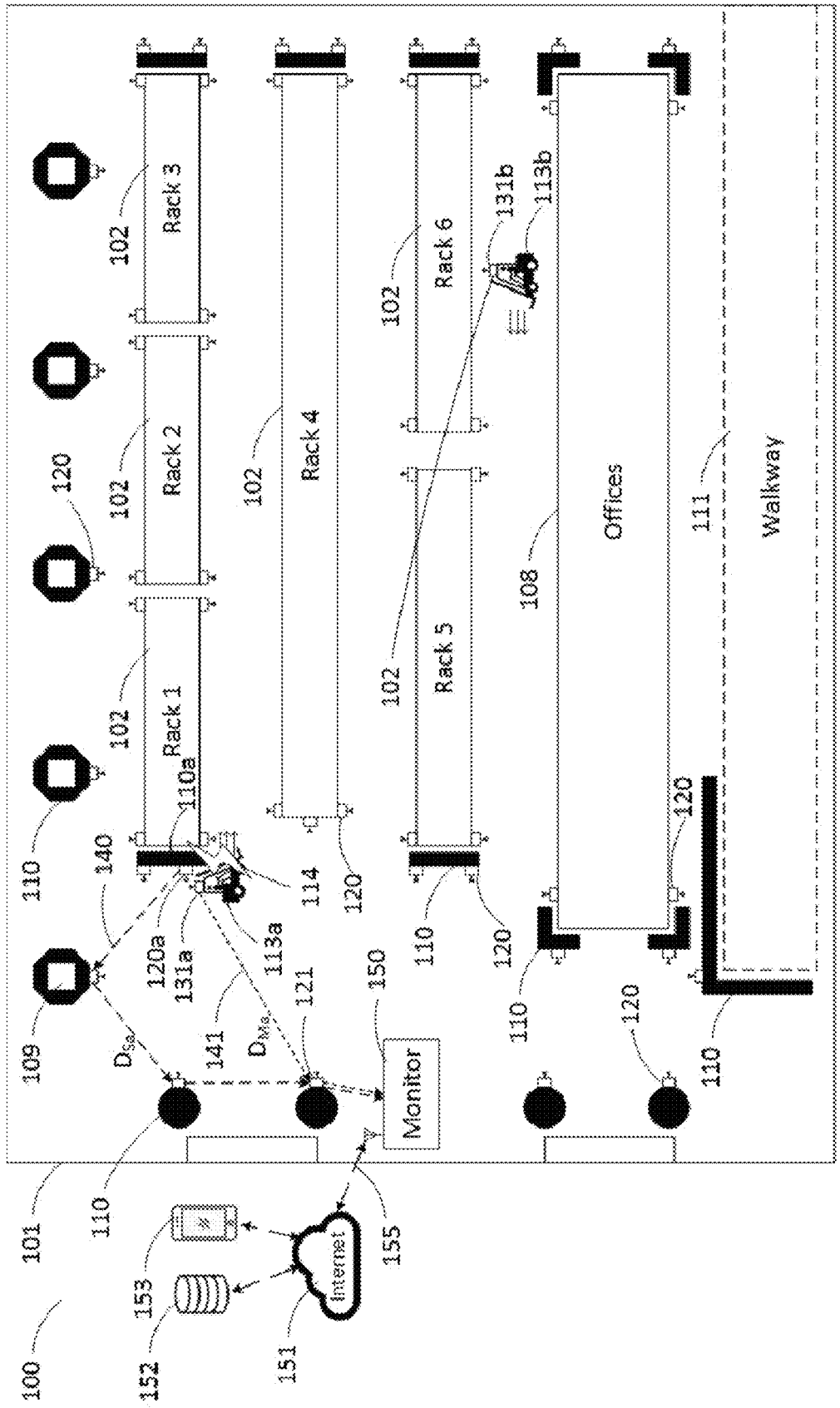
FIG. 1 shows an impact monitoring system.

Referring to FIG. 1, an example of a typical warehouse 101 (or other types of environment) includes racks 102 positioned, as shown here, in rows separated by aisles through which forklifts 113 maneuver to place or retrieve products stored on the shelving of the racks. Warehouse 101 also includes other stationary objects, such as support pillars 109 and protective barriers 110, which are positioned to limit access to equipment or restrictive areas such as offices 108 and a walkway 111.

The racks 102, pillars 109, and barriers 110 are prone to being struck by forklifts 113 or other mobile vehicles moving about the warehouse. To monitor events where the forklifts collide with the stationary objects, an impact monitoring system 100 is installed in the warehouse. The impact monitoring system 100 includes a monitor 150 and impact sensors including stationary sensors 120 affixed to stationary objects (racks, pillars, barriers) as well as mobile sensors 131 affixed to mobile vehicles (e.g., forklifts 113).

When a forklift 113a collides with a stationary object (e.g., stationary barrier 110a), both a mobile sensor 131a affixed to the forklift 113a and a stationary sensor 120a affixed to the stationary object 110a emit sensor data signals 141, 140 to transmit sensor data elements, $D_{Ma}$ (i.e., data from mobile sensor $M_a$) and $D_{sa}$ (i.e., data from stationary sensor $S_a$), respectively. In one example, each sensor data element includes an identifier of an object associated with the sensor data and a time that the sensor experienced an impact (e.g., $D_{Ma}=(M_a, t_5)$ and $D_{sa}=(S_a, t_5)$).

In some examples, the emitted sensor data signals are relayed to monitor 150 over a network established using the sensors (stationary and possibly mobile) in the warehouse as nodes. As is described in greater detail below, the monitor 150 processes received sensor data to generate alarm data 155 including, for example, an identification of the forklift 113a and the associated operator involved in the collision, an identification of the stationary object 110a involved in the collision, and the time of the collision. Monitor 150 transmits the alert data over the internet 151 to external applications such as a monitoring application on a warehouse supervisor's smartphone 153 or a database application 152.

In some examples, to establish the sensor network, each of the stationary impact sensors 120 or mobile impact sensors 131 communicates wirelessly with other nearby sensors within a corresponding wireless communication range to relay collected data towards client node 121 (closest node to monitor 150) to ultimately reach monitor 150. A portion of or all the wireless communications may be based on Bluetooth technology or similar close-range wireless technologies.

2 Monitor

Figure 2:
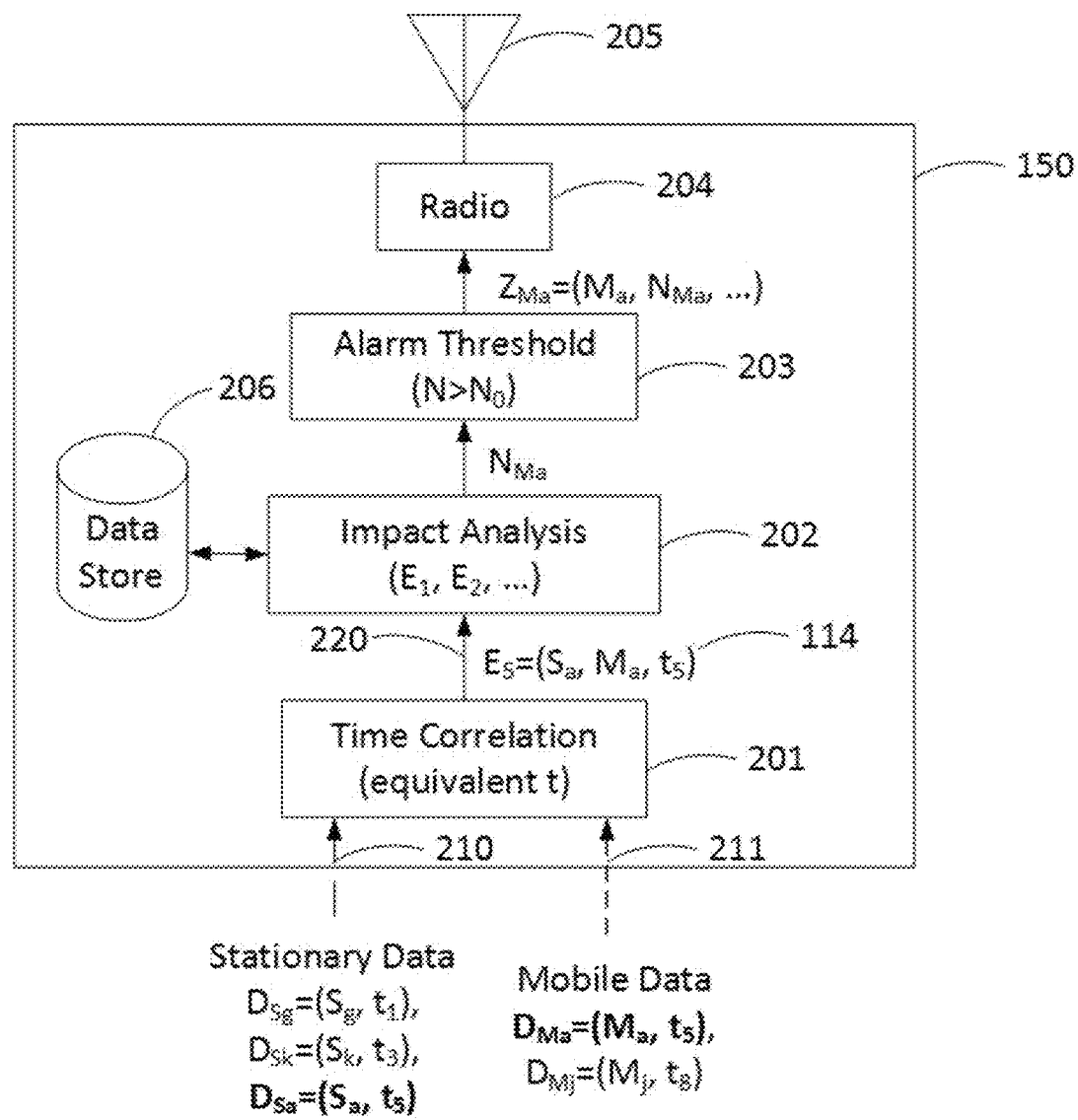
FIG. 2 is a schematic diagram for the operation of a monitor.

Referring to FIG. 2, in one example, monitor 150 includes a time correlation unit 201, an impact analysis unit 202 supported by a data store 206, an alarm threshold unit 203, a radio 204, and an antenna 205. The time correlation unit 201 of monitor 150 receives and stores both the stationary sensor data elements 210 (e.g., $D_{sg}$, $D_{sk}$, $D_{sa}$, etc.) and the mobile sensor data elements 211 (e.g., $D_{Ma}$, $D_{Mj}$, etc.) from the warehouse network. It is important to note that the stationary sensor data elements 210 and the mobile sensor data elements 211 may be received by the time correlation unit 201 at different times (e.g., $t_1$, $t_3$, $t_5$).

The time correlation unit 201 then correlates the sensor data elements 210, 211 to identify impact events 114 where a mobile object such as a forklift collides with a stationary object such as a rack. In some examples, impact events 114 are identified by determining that a mobile sensor data element and a stationary sensor data element have an equivalent timestamp (i.e., a mobile object and a stationary object experienced an impact at the same time). The sensor data elements correlated by the time correlation unit 201 are used to generate the impact events $E_k=(S_i, M_j, t_k)$, where $S_i$ represents the $i^{th}$ stationary object involved in the event, $M_j$ represents the $j^{th}$ mobile object involved in the event, and $t_x$ is the time of the kth impact event. Mobile sensor data elements with timestamps that don't match the timestamp of any stationary sensor data element, and vice versa, are not considered to be part of an impact event.

The impact events Ex (e.g., $E_1$, $E_2$, . . . ) generated by the time correlation unit 201 are received by the impact analysis unit 202 and stored in the data store 206. In certain embodiments, when a new impact event is received by the impact analysis unit 202, the impact analysis unit 202 processes the stored impact events to determine an aggregation of impact events ($N_M$) for each mobile object (i.e., counts of the number of times each mobile object has been involved in an impact). For example, a particular mobile sensor could be involved in multiple impact events at different times and locations with different stationary sensors according to the stored records in the data store 206, and that mobile sensor would be associated with a number corresponding to the multiple impact events as $N_M$. Impact analysis 202 can also rank all mobile sensors according to their respective number of impact events. The more impact events a mobile sensor is involved in, the more troublesome is its corresponding forklift or associated operator.

The impact analysis module 202 provides the aggregation, $N_M$ to the alarm threshold unit 203, which compares the number of impact events associated with each mobile object to a threshold number of impact events, No. In some examples, No represents a minimum number of impact events for a forklift and the associated operator to be found troublesome and needing attention by the warehouse supervisor. If the number of impact events for any of the mobile objects represented in the aggregation exceeds the threshold, then alarm data, $Z_M$, including the identity of the mobile sensor that has exceeded the threshold and the number of impact events, is output by the alarm threshold unit 203 to the radio. Alternatively, alarm threshold unit 203 may also output an alarm data $Z_M$ including the identity of the mobile sensor involved in an impact when a magnitude of the corresponding acceleration signature of the impact event exceeds a threshold (not shown). The radio 204 transmits the alarm data, from the monitor 150 to external devices via the internet, as described above in relation to FIG. 1.

2.1 Exemplary Monitor Operation

In the example shown in FIG. 2, the time correlation unit 201 has received three stationary sensor data elements 210: $D_{sg}=(S_g, t_1)$, $D_{sk}=(S_k, t_3)$, $D_{sa}=(S_a, t_5)$. The time correlation unit 201 has also received two mobile sensor data elements 211: $D_{Ma}=(M_a, t_5)$, $D_{Mj}=(M_j, t_8)$. The time correlation unit processes the stationary sensor data elements 210 and the mobile sensor data elements 211 and determines that $D_{sa}$ and $D_{Ma}$ have the same timestamp (i.e., $t_5$), and generates impact event data 220: $E_5=(S_a, M_a, t_5)$ to indicate that an impact event occurred at time $t_5$ between stationary object 110a and mobile object 113a.

The impact event, E associated with time $t_1$ is processed by the impact analysis unit 202 to recognize that mobile object $M_a$, was involved in another collision. Hypothetically, because the mobile object $M_a$ has already been in 4 previous impact events, the impact analysis unit 202 updates the aggregation of impact events $N_{Ma}$ by incrementing the number of impacts for mobile object $M_a$ from 4 to 5. However, the number of impacts for mobile object $M_b$ remains unchanged, because mobile object $M_b$ is not involved in $E_1$.

The updated aggregation of impact events $N_{Ma}$ is provided to the alarm threshold 203 which, in this example, has a threshold number set to be $N_0=4$. Since $N_{Ma}>N_0$, the alarm threshold unit 203 outputs a signal $Z_{Ma}$ associated with the $M_a$ sensor including its mobile sensor identity $M_a$, the number of impact events $N_{Ma}$, and all other related information such as the identities of all 5 impact events, the identities of all 5 stationary sensors involved and all 5 timestamps for the events, etc. The signal $Z_{Ma}$ is then transmitted by radio 204 and antenna 205 to external applications via the internet 151 (sec FIG. 1).

Figure 3:
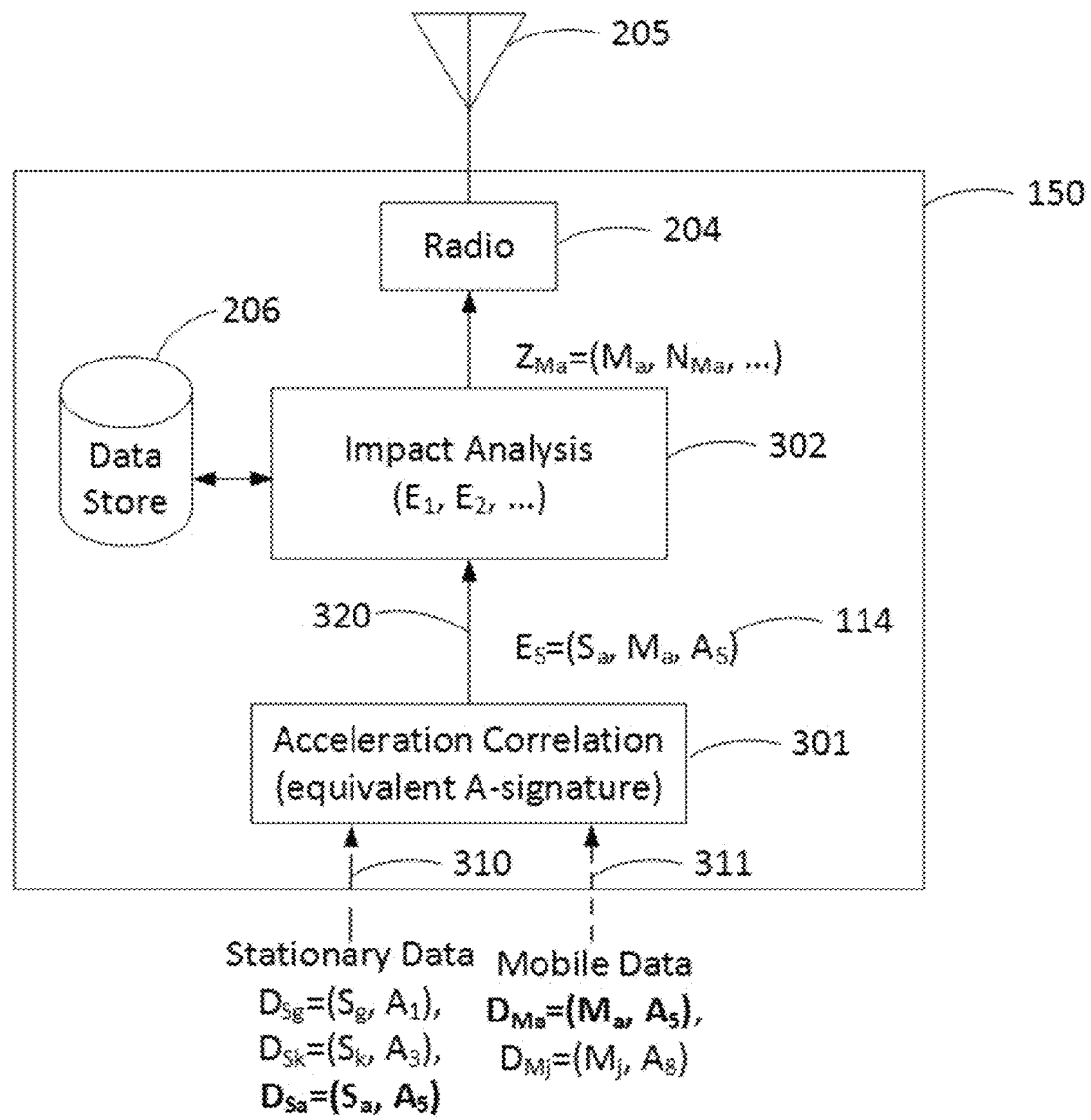
FIG. 3 is a schematic diagram for the operation of an alternative monitor.

Referring to FIG. 3, in another example, monitor 150 includes an acceleration correlation unit 301, an impact analysis unit 302 supported by a data store 206, a radio 204, and an antenna 205. Received stationary data element 310 includes one or more data sets $D_{si}=(S_i, A_a)$ and received mobile data element 311 includes one or more data sets $D_{Mj}=(M_j, A_b)$. In this case, received data sets $D_{si}$ and $D_j$ include no timestamp data but acceleration signatures $A_a$ and $A_b$, instead, which may include magnitude and direction data.

In one example, acceleration correlation unit 301 receives stationary data 310: $D_{sg}=(S_g, A_1)$, $D_{sk}=(S_k, A_3)$, $D_{sa}=(S_a, A_5)$ and mobile data 311: $D_{Ma}=(M_a, A_5)$, $D_{Mj}=(M_j, A_8)$, and then correlates them by determining that $D_{sa}$ and $D_{Ma}$ have equivalent acceleration signatures (i.e., $A_5$). Acceleration correlation unit 301 then generates impact event data 320: $E_5=(S_a, M_a, A_5)$ to indicate that an impact event occurred between stationary object 110a and mobile object 113a with an equivalent acceleration signature $A_5$. This acceleration correlation is based on Newton's Third Law of Motion predicting that, during each impact event 114, the respective impact acceleration data for the involved stationary and mobile sensors should both have an equivalent signature, although with opposite acceleration directions. Mobile sensor data elements with acceleration signatures that don't match the acceleration signature of any stationary sensor data element, and vice versa, are not considered to be part of an impact event.

Similarly, after completion of the acceleration correlation, correlated data 320 are then analyzed by impact analysis unit 302 by aggregating the received data over multiple impact events ($E_1$, $E_2$, . . . ) stored in the data store 206. For example, the impact analysis unit 302 counts the number of impacts $N_{Ma}$ of each $M_a$ involved in all impact events and ranks each $M_a$ according to $N_{Ma}$ to evaluate the relative likelihood of each individual forklift and its associated operator to cause an impact event. The analysis result $Z_{Ma}$ is then sent externally through radio 204 and antenna 205 with or without triggering an alarm.

Figure 4:
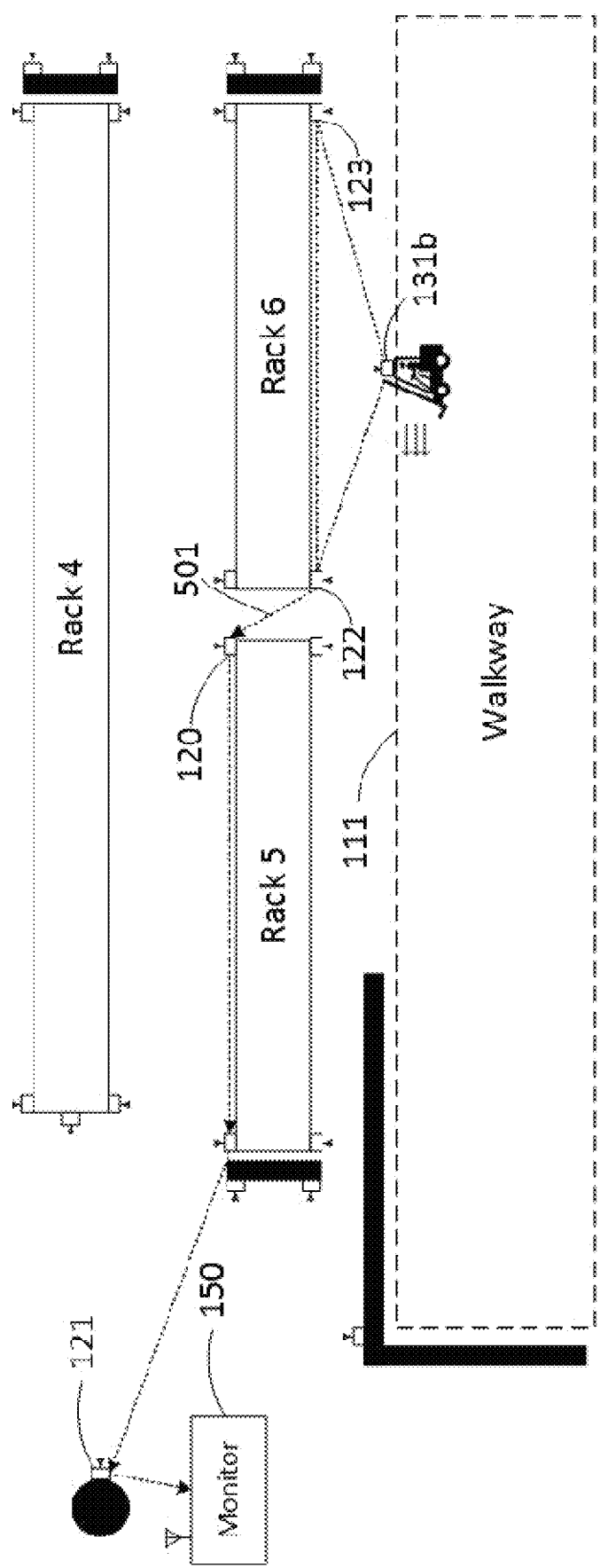
FIG. 4 shows a location monitoring system.

Referring to FIG. 4, in some examples, in addition to collecting data during impact events, mobile sensor 131b and nearby stationary sensors 122, 123 are also capable of determining the location of mobile sensor 131b in real time through a triangulation process by wirelessly communicating with one another. Location data 501 of mobile sensor 131b is relayed wirelessly by intermediary sensors 120 in a network to reach monitor 150 for monitoring the movement of the forklift. If location data 501 determines that mobile sensor 131b (and forklift 113b) is trespassing into a restricted area such as a walkway 111, monitor 150 can send an alarm signal to external applications. Location data 501 of a particular mobile sensor may also be used to determine involvement of the mobile sensor in an impact event.

3 Alternatives

In another example, impact analysis 202 generates a distribution plot for the number of impact events as a function of corresponding time within each day cycle aggregated over different days for all impact events to identify a time pattern or trend of the events. This analysis helps the warehouse supervisor to identify high and low frequency periods of each day when impact events tend to occur.

In some examples, impact analysis 202 generates a distribution plot for the number of impact events as a function of corresponding time within each day cycle aggregated over multiple days for a particular sensor to identify a time pattern or trend of all impact events for that particular sensor.

In another example, impact analysis 302 generates a distribution plot for the number of impacts as a function of corresponding acceleration signatures aggregated over all impact events to identify a pattern or trend of the magnitude or direction data of the events. This analysis helps the warehouse supervisor to monitor particular types of impact events which tend to occur more frequently.

In some examples, impact analysis 302 generates a distribution plot for the number of impacts as a function of corresponding acceleration signatures aggregated over all involved impact events for a particular sensor to identify a pattern or trend of the magnitude or direction data for that particular sensor.

In some examples, both time and acceleration data can be received and analyzed by monitor 150 to generate distribution plots of acceleration signatures as a function of corresponding time within each day cycle aggregated over multiple days for all impact events to identify patterns and trends of particular types of impact events throughout a day cycle.

In another example, monitor 150 aggregates the received trespassing (i.e., mobile objects entering prohibited areas such as walkways) data of mobile sensors over time and processes the aggregated data through impact analysis to provide the user with counts, ranks, patterns, and trends related to different mobile sensors and trespassing events in ways similar to those described above. An alarm threshold can be set in monitor 150 to send out alarm signals including mobile sensor identities or restrictive area locations involved in trespassing counts above the threshold number.

In some examples, each stationary and mobile sensor is configured to analyze the distance from a nearby sensor according to the received signal strength from the nearby sensor. This allows not only the determination of sensor locations (e.g., for provisioning) by triangulation, but also the monitoring of any potential change in the location of a stationary sensor caused by a physical impact.

In some examples, the monitor may generate a visual representation of the real time status of some or all of the sensors in the warehouse, which includes real time data relating to the health, location, power, and other aspects of the sensors.

In another example, some of the stationary or mobile sensors need not be provisioned.

4 Implementations

The approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. An impact monitoring system comprising:
   a plurality of sensor nodes including
   a plurality of stationary sensor nodes affixed to stationary objects in an environment,
      the plurality of stationary sensor nodes including a first stationary sensor node affixed to a first stationary object; and
      one or more mobile sensor nodes affixed to mobile objects in the environment, the one or more mobile sensor nodes including a second mobile sensor node affixed to a second mobile object; and
   a monitor configured to wirelessly receive first data characterizing an impact event experienced by the first stationary sensor node and second data characterizing the impact event experienced by the second mobile sensor node, and to identify that the second mobile object impacted the first stationary object based at least in part on the first data and the second data; and wherein two of the stationary sensor nodes and one of the one or more mobile sensor nodes identify a trespassing event based at least in part on determining a location of the mobile sensor node by a triangulation process, and the monitor is configured to receive and aggregate data of a plurality of trespassing events of the one or more mobile sensor nodes to provide a user with counts, ranks, patterns, and trends related to the plurality of trespassing events.

2. The system of claim 1, wherein the monitor is configured to correlate the first data and the second data as resulting from a same impact event.

3. The system of claim 2, wherein the monitor is configured to determine the same impact event on the basis of a time characteristic detected by at least one of the plurality of stationary sensor nodes and at least one of the one or more mobile sensor nodes.

4. The system of claim 2, wherein the monitor is configured to determine the same impact event on the basis of an acceleration characteristic detected by at least one of the plurality of stationary sensor nodes and at least one of the one or more mobile sensor nodes.

5. The system of claim 2, wherein the monitor is configured to aggregate correlated data from a plurality of impact events.

6. The system of claim 5, wherein the monitor is configured to count impact events involving each mobile sensor node.

7. The system of claim 6, wherein the monitor is configured to generate a ranking of the one or more mobile sensor nodes according to each mobile sensor node's count of impact events to evaluate the relative likelihood for a corresponding mobile object and operator to cause an impact event.

8. The system of claim 6, wherein the monitor is configured to generate a distribution plot for a count of impact events involving a sensor node as a function of corresponding time of impact within each time cycle aggregated over a plurality of time cycles to identify a time pattern or trend of a plurality of impact events involving the sensor node.

9. The system of claim 5, wherein the monitor is configured to generate a distribution plot for a count of impact events as a function of corresponding time of impact within a time cycle aggregated over a plurality of time cycles to identify a time pattern or trend of the plurality of impact events.

10. The system of claim 5, wherein the monitor is configured to generate a distribution plot for a count of impact events as a function of corresponding acceleration characteristic aggregated over the plurality of impact events to identify a pattern or trend of a magnitude or direction of the plurality of impact events.

11. The system of claim 5, wherein the monitor is configured to generate a distribution plot for an acceleration characteristic as a function of corresponding time of impact for a plurality of impact events within a time cycle aggregated over a plurality of time cycles to identify patterns and trends of a type of impact within the time cycle.

12. The system of claim 1, wherein the monitor is configured to generate a visual representation of real time status of the plurality of stationary sensor nodes and the one or more mobile sensor nodes in the environment.

13. A method for impact monitoring, comprising:

affixing a plurality of stationary sensor nodes to stationary objects in an environment, the plurality of stationary sensor nodes including a first stationary sensor node affixed to a first stationary object;

affixing one or more mobile sensor nodes to mobile objects in the environment, the one or more mobile sensor nodes including a second mobile sensor node affixed to a second mobile object;

wirelessly receiving first data characterizing an impact event experienced by the first stationary sensor node and second data characterizing the impact event experienced by the second mobile sensor node;

identifying that the second mobile object impacted the first stationary object based at least in part on the first data and the second data; and identifying a trespassing event by two of the stationary sensor nodes and one of the one or more mobile sensor nodes based at least in part on determining a location of the mobile sensor node through a triangulation process; and f) receiving wirelessly and aggregating data of a plurality of trespassing events of the one or more mobile sensor nodes to provide a user with counts, ranks, patterns, and trends related to the plurality of trespassing events.

14. The method of claim 13, wherein identifying that the second mobile object impacted the first stationary object includes correlating the first data and the second data as resulting from a same impact event on the basis of a time characteristic detected by the first stationary sensor node and the second mobile sensor node.

15. The method of claim 13, wherein identifying that the second mobile object impacted the first stationary object includes correlating the first data and the second data as resulting from a same impact event on the basis of an acceleration characteristic detected by the first stationary sensor node and the second mobile sensor node.

16. The method of claim 13, further comprising counting impact events involving each mobile sensor node.

17. The method of claim 16, further comprising generating a ranking of the one or more mobile sensor nodes according to each mobile sensor node's count of impact events to evaluate the relative likelihood for a corresponding mobile object and operator to cause an impact event.

18. The method of claim 13, further comprising generating a distribution plot for a count of impact events as a function of corresponding time of impact within a time cycle aggregated over a plurality of time cycles to identify a time pattern or trend of a plurality of impact events.

19. The method of claim 13, further comprising generating a distribution plot for a count of impact events as a function of a corresponding acceleration characteristic aggregated over a plurality of impact events to identify a pattern or trend of a magnitude or direction of the plurality of impact events.

20. The method of claim 13, further comprising generating a distribution plot for an acceleration characteristic as a function of corresponding time of impact for a plurality of impact events within a time cycle aggregated over a plurality of time cycles to identify patterns and trends of a type of impact within the time cycle.

21. The method of claim 13, further comprising generating a visual representation of real time status of the plurality of stationary sensor nodes and the one or more mobile sensor nodes in the environment.

22. A non-transitory machine-readable medium having instructions stored thereon, said instructions when executed by a processor cause the processor to:

wirelessly receive first data characterizing an impact event experienced by a first stationary sensor node affixed to a first stationary object in an environment and second data characterizing the impact event experienced by a second mobile sensor node affixed to a mobile object in the environment;

identify that the second mobile object impacted the first stationary object based at least in part on the first data and the second data; and identify a trespassing event by two of the stationary sensor nodes and one of the one or more mobile sensor nodes based at least in part on determining a location of the mobile sensor node through a triangulation process; and f) receive wirelessly and aggregate data of a plurality of trespassing events of the one or more mobile sensor nodes to provide a user with counts, ranks, patterns, and trends related to the plurality of trespassing events.

\* \* \* \* \*